(12) United States Patent
Xiong et al.

(10) Patent No.: US 7,459,182 B2
(45) Date of Patent: Dec. 2, 2008

(54) PROCESS FOR THE PREPARATION OF METAL OXIDE COATED ORGANIC MATERIAL BY MICROWAVE DEPOSITION

(75) Inventors: Rong Xiong, Dobbs Ferry, NY (US); Stephen Daniel Pastor, Mayhill, NM (US); Patrice Bujard, Courtepin (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 946 days.

(21) Appl. No.: 10/870,643

(22) Filed: Jun. 10, 2004

(65) Prior Publication Data

US 2004/0265507 A1 Dec. 30, 2004

Related U.S. Application Data

(60) Provisional application No. 60/515,015, filed on Oct. 28, 2003, provisional application No. 60/479,011, filed on Jun. 17, 2003.

(51) Int. Cl.
*B05D 7/00* (2006.01)
(52) U.S. Cl. ............... 427/214; 427/212; 427/561; 264/6
(58) Field of Classification Search ............ 427/215, 427/214; 264/6, 123
See application file for complete search history.

(56) References Cited

U.S. PATENT DOCUMENTS

| 3,087,827 | A | | 4/1963 | Klenke, Jr. et al. ......... 106/291 |
|---|---|---|---|---|
| 4,217,038 | A | * | 8/1980 | Letter et al. ............. 351/160 R |
| 5,733,371 | A | | 3/1998 | Hashio et al. .............. 117/208 |
| 5,855,660 | A | | 1/1999 | Bujard et al. .............. 106/418 |
| 5,958,125 | A | | 9/1999 | Schmid et al. ............. 106/417 |
| 6,066,359 | A | * | 5/2000 | Yao et al. ................. 427/126.3 |
| 6,238,471 | B1 | * | 5/2001 | Vogt et al. ................. 106/417 |
| 6,369,147 | B1 | | 4/2002 | Polonka et al. ............ 524/413 |
| 6,500,251 | B1 | * | 12/2002 | Andes et al. ............... 106/415 |
| 2002/0147108 | A1 | * | 10/2002 | Sato et al. ................. 502/350 |
| 2003/0075079 | A1 | | 4/2003 | Sommer .................... 106/442 |

OTHER PUBLICATIONS

Piero et al., "Titanium(1V) oxide thin films obtained by a two-step soft-solution," 2002, Thin Solid Films 411, pp. 185-191.*
E. Vigil et al., Thin Solid Films, vol. 365, (2000), pp. 12-18.
E. Vigil et al., Journal of Materials Science Letters, vol. 18, (1999), pp. 1067-1069.
E. Vigil et al., Langmuir, vol. 17, (2001), pp. 891-896.
E. Lerner et al., Journal of Materials Science: Materials in Medicine, vol. 2, (1991), pp. 138-141.
D. Daichuan et al., Materials Research Bulletin, vol. 30, No. 5, pp. 537-541, (1995).
C. Leonelli et al., Microwaves: Theory and Application in Materials Processing V, (2001), pp. 321-327.
I. Girnus et al., Zeolites, vol. 15, pp. 33-39, (1995).
R. Rodriguez-Clemente et al., Journal of Crystal Growth, vol. 169, (1996), pp. 339-346.
D. Daichuan et al., Materials Research Bulletin, vol. 30, No. 5, pp. 531-535, (1995).
A. Peiró et al., Thin Solid Films, vol. 411, (2002), pp. 185-191.

* cited by examiner

*Primary Examiner*—Michael Cleveland
*Assistant Examiner*—Robert Vetere
(74) *Attorney, Agent, or Firm*—Shiela A. Loggins

(57) ABSTRACT

A process for the preparation of organic material comprising an organic substrate and at least one dielectric layer consisting of one or more oxides of a metal selected from groups 3 to 15 of the periodic table, which comprises the steps of:

(a) suspending the organic material in an aqueous solution of fluorine scavenger;
(b) adding an aqueous solution of one or more fluorine containing metal complexes which are the precursors of the desired metal oxide coating; and
(c) subjecting said suspension to microwave radiation to deposit the metal oxide onto said organic material, wherein steps (b) and (c) can optionally be repeated using different fluorine containing metal complexes to produce one or more metal oxide layers.

The substrate can be optionally dissolved with solvent to yield free metal oxide or mixed metal oxides that have a plane-parallel structure.

17 Claims, No Drawings

PROCESS FOR THE PREPARATION OF METAL OXIDE COATED ORGANIC MATERIAL BY MICROWAVE DEPOSITION

This application claims the benefit of U.S. Provisional Application No. 60/479,011 filed Jun. 17, 2003 and of U.S. Provisional Application No. 60/515,015 filed Oct. 28, 2003.

The invention relates to a process of using microwave deposition of a metal oxide or mixed metal oxides from an aqueous solution of fluorine scavenger onto an organic substrate. The substrate can be optionally dissolved with solvent to yield free metal oxide or mixed metal oxides that have a plane-parallel structure.

BACKGROUND

Methods involving deposition of a metal oxide layer via liquid phase decomposition (hydrolysis) of a corresponding salt (i.e. sulfate or halide) are known per se and have been used to form luster, or pearlescent pigments which have translucent, non-reflective mica core materials. However, such methods, described for example in U.S. Pat. No. 3,087,827 and U.S. Pat. No. 5,733,371, have not been considered suitable for forming effect pigments with reflective metallic cores in the highly acid (pH of less than 4), aqueous solutions required by such processes. U.S. Pat. No. 6,369,147 discloses a process that solves the foregoing problem by selecting certain metal cores and optionally treating them in such a way that they are rendered more corrosion resistant.

Use of microwave energy for the deposition of metal oxide films onto glass and indium tin oxide coated glass plates used for LED devices is known and disclosed in numerous journal articles such as E. Vigil, L. Saadoun, Thin Solid Films 2000, 365, pp 12-18 and E. Vigil, L. Saadoun, J. Materials Science Letters 1999, 18 pp 1067-1069. Good adhesion was obtained only on indium tin oxide coated glass plates, which the authors suggested was due to some electron donation ability of the indium tin oxide coating (see Vigil, E.; Ayllón, J. A.; Peiró, A. M.; Rodriguez-Clemente, R.; Doménech, X.; Peral, J. Langmuir 2001, 17, 891).

The bulk precipitation of metal oxide particles by microwave irradiation is well known. For examples of bulk precipitation oxides using microwave deposition, see (1) Lerner, E.; Sarig, S.; Azoury, R., Journal of Materials Science: Materials in Medicine 1991, 2, 138 (2) Daichuan, D.; Pinjie, H.; Shushan, D. Materials Research Bulletin, 1995, 30, 537 (3) Leonelli, C. et al., Microwaves: Theory and Applications in Materials Processing 2001, 111, 321, (4) Girnus, I. et al., Zeolites 1995, 15, 33, (5) Rodriguez-Clemente, R. et al., Journal of Crystal Growth 1996, 169, 339 and (6) Daichuan, D.; Pinjie, H.; Shushan, D. Materials Research Bulletin, 1995, 30, 531.

Surprisingly, applicants have found that use of the microwave deposition process of the present invention allows for a process for the deposition of uniform, semi-transparent or transparent, thin films of metal oxides on cores of uniform thickness, which thickness can be adjusted based upon the mass ratio of the organic substrate material to the metal oxide (mass of metal oxide precursor material), allowing for the preparation of thin films of metal oxides of a variety of thicknesses depending upon the desired effect without precipitation of the metal oxide. When the metal oxide layer is made with liquid phase deposition, and conventional heating is applied, energy is transferred from the surface to the inorganic bulk mixture and eventually to the substrate material. With microwave treatment, energy is focused on the substrate material due to the better absorbance of the microwave energy by the substrate than the bulk mixture. This will make the substrate the reaction center, which allows the reaction to take place with higher probability at the surface of the substrate. Reaction at the surface results in better adhesion of the coating layer and significantly less bulk precipitation. The good surface adhesion, easy adjustment of reaction conditions to change the thickness or composition of the coating, as well as minimal deposition into the bulk media, are significant advantages of the instant invention.

Accordingly, it is an object of the invention to provide a process of using microwave deposition of metal oxide layers onto an organic substrate as defined hereinafter. The coated organic material can exhibit an optical goniochromatic effect. Or otherwise the organic material can be dissolved to yield free metal oxide or mixed metal oxides that exhibit an optical goniochromatic effect.

SUMMARY OF THE INVENTION

The present invention provides a process for the preparation of a metal oxide coated organic material using microwave deposition of metal oxide(s) from an aqueous solution of fluorine scavenger onto an organic substrate, and optionally, the preparation of metal oxide(s) by removing said organic substrate by dissolving it with suitable solvent.

DETAILED DESCRIPTION

The process of the present invention for the preparation of an organic material comprising an organic substrate and at least one dielectric layer consisting of one or more oxides of a metal selected from groups 3 to 15 of the periodic table, comprises the steps of:

(a) suspending the organic substrate in an aqueous solution of fluorine scavenger;

(b) adding an aqueous solution of one or more fluorine containing metal complexes which are the precursors of the desired metal oxide coating; and (c) subjecting said suspension to microwave radiation to deposit the metal oxide onto said organic substrate, wherein steps (b) and (c) can optionally be repeated using different fluorine containing metal complexes to produce one or more metal oxide layers or a gradient of concentration of 2 different metal oxides across the thickness.

These layers may alter the optical goniochromatic properties because of their different refractive indices, or affect other properties, such as, catalyzing the formation of certain morphologies or suppressing photoactivity.

Preferably, the fluorine containing metal complex is added continuously to the suspension of organic substrate in the solution of fluorine scavenger.

The organic substrate can be any polymeric or other organic material that will not deform and decompose at the processing temperature.

Suitable organic substrates for use in the present invention include, but are not limited to polycarbonate, polyamide, polyethylene, polypropylene, polyethylene terephthalate, polymethyl methacrylate (PMMA), epoxy resins, ABS (acrylonitrile/butadiene/styrene), polyolefin matrices and the like.

If the organic material is employed as core of effect pigments it has a plane-parallel (plate-like) structure (flake). The flakes have a thickness of from 20 to 2000 nm, especially from 200 to 800 nm. It is presently preferred that the diameter of the flakes be in a preferred range of about 1-60 µm with a more preferred range of about 5-40 µm. Thus, the aspect ratio of the flakes of the present invention is in a preferred range of about 2.5 to 625 with a more preferred range of about 50 to 250.

Effect pigments are metallic or non-metallic, inorganic platelet-shaped particles or pigments (especially metal effect pigments or interference pigments), that is to say, pigments, that, besides imparting color to an application medium, impart additional properties, for example angle dependency of the color (flop), lustre (not surface gloss) or texture. On metal effect pigments, substantially oriented reflection occurs at directionally oriented pigment particles. In the case of interference pigments, the color-imparting effect is due to the phenomenon of interference of light in thin, highly refractive layers.

Generally, the organic substrate is suspended in the aqueous solution of a fluorine scavenger via stirring or other forms of agitation. In the event that the organic substrate is not dispersible, e.g. a sheet or non-woven fabric, it may be placed in a solution or stirred suspension of the fluorine scavenger and microwave irradiated while a quantity of a solution of fluorine containing metal complex is added.

The fluorine scavenger is preferably any compound that can scavenge fluorine ions in aqueous solution such as boric acid, an alkali metal borate such as sodium borate, ammonium borate, boron anhydride or boron monoxide, particularly preferably boric acid. In one embodiment of the invention, boric acid is used. The concentration of the boric acid solution is at least that which is required to scavenge fluoride ion during the deposition of the metal oxide coating on the organic material. In one embodiment an excess of the boric acid is used as it may be removed by washing with water. Typically the boric acid is used in the range of about 0.01~0.5 M, preferably about 0.04~0.1 M, based upon the total amount of aqueous solution. The temperature of the boric acid solution is between the freezing point and the boiling point of the circulating media without the application of pressure. The process can be conveniently carried out between about 15° C. and about 95° C. With a vessel equipped with a back pressure regulator the temperature can also be set above the boiling point of the circulating media when the pressure inside the reaction vessel is properly set.

The oxides of elements of the groups 3 to 15 of the periodic table are deposited on the organic substrate in the process of the present invention by adding a solution of a fluorine containing metal complex which is a precursor of the desired metal oxide and applying microwave energy. Generally, the aqueous solution is added continuously to the suspended organic substrate in order to limit the precipitation of the metal oxide other than by deposition onto the organic material. The metal oxides that are suitable for coating the substrate material and subsequent layers of metal oxide are well known in the art and include $TiO_2$, $ZrO_2$, $CoO$, $SiO_2$, $SnO_2$, $GeO_2$, $ZnO$, $Al_2O_3$, $V_2O_5$, $Fe_2O_3$, $Cr_2O_3$, $PbTiO_3$ or $CuO$ or a mixture thereof. Particular preference is given to titanium dioxide. The precursor solution that forms the desired metal oxide is preferably an aqueous solution of one or a combination of the following materials:

(a) a soluble metal fluoride salt,
(b) a soluble metal fluorine complex, or
(c) any mixture that forms said salt or complex.

Examples include ammonium hexafluorotitanate; a complex prepared from ammonium fluoride and titanium chloride or titanium chloride, ammonium fluoride and hydrogen fluoride; ammonium hexafluorostanate; ammonium hexafluorosilicate; ammonium pentafluorosilicate; iron(III) chloride, hydrofluoric acid and ammonium fluoride mixtures; aluminum(III) chloride, hydrofluoric acid and ammonium fluoride mixtures; ammonium hexafluorogermanate; and a combination of indium(III) fluoride trihydrate and ammonium hexafluorostanate. In the last example it forms metal oxide films comprising more than one element-indium/tin oxide films. The concentration of the fluorine containing metal complex is not critical to the process and is dictated by what is easy to handle because the mixture can be irradiated until the desired thickness is obtained. Thus, the concentration may range from about 0.01 M up to a saturated solution. In one embodiment of the invention a range of about 0.1 M to about 0.2 M is used, based upon the total amount of aqueous solution.

For producing a mixed interference/absorption effect on the organic material, the metal oxide layer of dielectric material is preferably a colored (selectively absorbing, not gray or black) oxide or colored mixed oxides of elements of groups 5 to 12. A most preferred metal oxide layer comprises $Fe_2O_3$.

A colored metal oxide layer and/or colored metal oxide flakes can be produced, when the deposition of the metal oxide is carried out in the presence of an organic pigment. Suitable organic pigments are, for example, described in W. Herbst and K. Hunger, VCH Verlagsgesellschaft mbH, Weinheim/New York, 2nd, completely revised edition, 1995 and are, for example, selected from the group consisting of azo, azomethine, methine, anthraquinone, phthalocyanine, perinone, perylene, diketopyrrolopyrrole, thioindigo, iminoisoindoline, dioxazine, iminoisoindolinone, quinacridone, flavanthrone, indanthrone, anthrapyrimidine and quinophthalone pigments, or a mixture or solid solution thereof; especially an azo, dioxazine, perylene, diketopyrrolopyrrole, quinacridone, phthalocyanine, indanthrone or iminoisoindolinone pigment, or a mixture or solid solution thereof.

Notable pigments useful in the present invention are those pigments described in the Color Index, including the group consisting of C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Yellow 191.1, C.I. Pigment Yellow 74, C.I. Pigment Yellow 83, C.I. Pigment Yellow 13, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, and C.I. Pigment Green 36, or a mixture or solid solution thereof.

Another preferred pigment is the condensation product of

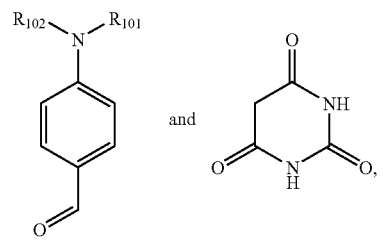

wherein $R_{101}$ and $R_{102}$ are independently hydrogen or $C_1$-$C_{18}$ alkyl, such as for example, methyl, ethyl, n-propyl, isopropyl, n-butyl, sec-butyl, isobutyl, tert-butyl, n-amyl, tert-amyl, hexyl, heptyl, octyl, 2-ethylhexyl, nonyl, decyl, dodecyl, tetradecyl, hexadecyl or octadecyl.

Preferably $R_{101}$ and $R_{102}$ are methyl. The condensation product is of formula

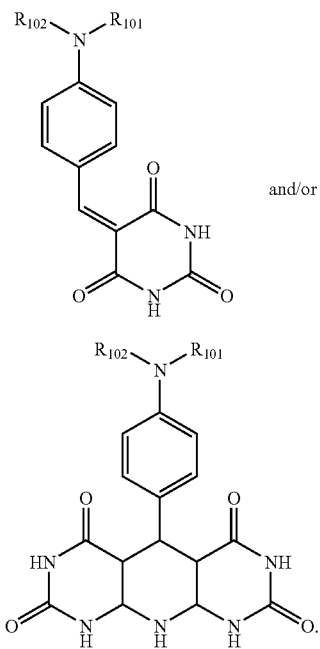

and/or

For producing a pure interference effect on the organic material, the metal oxide layer is preferably a substantially colorless oxide of an element of groups 3 or 4.

The thickness of the metal oxide coating is that which produces an optical goniochromatic effect from the coated organic material or the free metal oxide after organic material is removed. The film thickness will vary depending upon the organic material substrate and the optical goniochromatic effect desired. The thickness of the layers is not critical per se and will in general range from 1 to 500 nm, preferably from 10 to 300 nm. In one embodiment of the invention the metal oxide layers have a physical thickness of at least about 150 nm, most preferably about 50 to 400 nm. Different oxides at different thicknesses produce different colors.

For producing metal oxide(s) with plane-parallel structure by removing the organic material with a suitable solvent, the metal oxide(s) layer is preferably an oxide or mixed oxides of element of groups 3 to 12. A most preferred metal oxide layer comprises $Fe_2O_3$, $SiO_2$, or $TiO_2$. In said preferred embodiment the organic substrate is a plate of PMMA or plate-like PMMA, the fluorine containing metal complex of step (b) is ammonium hexafluorotitanate, an ammonium fluorosilicate salt, or iron(III) chloride/ammonium fluoride, and the process further comprises (d') dissolving of the PMMA in an organic liquid, such as toluene, or acetone, whereby $TiO_2$, $SiO_2$, or $Fe_2O_3$ flakes are produced.

The $TiO_2$, $SiO_2$, or $Fe_2O_3$ flakes obtained in step (d') can be processed to effect pigments and can, therefore, be suspended in an aqueous solution of a fluorine scavenger; to which (f) an aqueous solution of one or more fluorine containing metal complexes, which are the precursors of the desired metal oxide coating, is added.

And (g) said suspension is subjected to microwave radiation to deposit the metal oxide onto said organic material.

In a particularly preferred embodiment, the metal oxide in steps (b) and (f) is iron oxide and the fluorine containing metal complex is selected from the group iron(III) chloride, hydrofluoric acid and ammonium fluoride mixtures, and the metal oxide in step (d) is titanium dioxide and the fluorine containing metal complex is selected from the group consisting of ammonium hexafluorotitanate, a complex prepared from ammonium fluoride and titanium chloride or titanium chloride, ammonium fluoride and hydrogen fluoride.

Effect pigments, comprising different layers of the above mentioned metal oxides, can also be produced by microwave deposition of the metal oxides on a plate of PMMA or plate-like PMMA and then dissolving of the PMMA in an organic liquid, such as toluene, or acetone.

In said method a metal oxide coating is provided on the surface of the organic material. The metal oxide coating is separated from the organic material to produce a plurality of metal oxide flakes. The size of the flakes is adjusted for the particular application. The separation of the flakes from the organic material can be accomplished by immersing the metal oxide coated organic material in a liquid which dissolves the organic material. Alternatively, the surface of the organic material can be coated with a release layer, such as, for example, a solvent-based resin solution, before it is coated with the metal oxide(s) by microwave deposition. In this case the flakes are separated from the organic material by dissolution of the release layer.

In a preferred embodiment of the present invention, both sides of an organic material carrier, such as polyesters, polyolefins, polycarbonate, polyamide, polyethylene, polypropylene, polyethylene terephthalate, polymethyl methacrylate (PMMA), epoxy resins, ABS (acrylonitrile/butadiene/styrene), polyolefin matrices and the like, are coated by a coating or printing technique (preferably rotogravure or flexo) with a solvent-based resin solution, such as, for example acrylics, cellulose systems, vinyl resins etc. The dried coated web is then coated on both sides of the sheet with one or more metal oxides by microwave deposition. The coatings are stripped from the carrier in a solvent, such as acetone. The stripping operation breaks the continuous layer into particles contained in a slurry. The slurry is then subjected to sonic treatment and centrifuging to remove the solvent and the dissolved coating, leaving a cake of concentrated metal oxide flakes. The cake is then let down in a suitable vehicle and further sized by homogenizing, for example, vigorous stirring, or ultrasonic treatment, into flakes of controlled size for use in inks, paints, and coatings. Metal oxide flakes, such as aluminum oxide, indium oxide, indium tin oxide, titanium oxide, and iron oxide flakes, produced by this process are characterized by a particle size from about 1 to 100 microns and a thickness from about 10 to about 500 nm. The flakes have a smooth mirror-like surface and a high aspect ratio.

Any available microwave source can be used. Furthermore, the frequency of the microwave, if the source is adjustable, can be tuned to promote deposition of metal oxide onto the surface. A presently preferred microwave oven is a laboratory modified Panasonic NN-S542 with 2,450 MHz operating frequency and 1,300 W power output.

Once the addition of fluorine containing metal complex is completed and the desired metal oxide layer thickness is achieved, the suspension can be filtered and washed with deionized water, dried and, optionally, calcined at a temperature below the decomposition temperature of the organic material for about 15 to 30 minutes, most preferably under a non-oxidizing atmosphere.

After the coating process, the organic substrate can be dissolved with solvent at a temperature equal or below the boiling point of the solvent. Suitable solvents include one or a mixture of acetone, toluene, xylene, methanol, ethanol, ethyl acetate, methylene chloride, chloroform, diethyl ether, and the like.

Hence, in a preferred embodiment of the present invention the organic substrate is a plate of PMMA or plate-like PMMA, the fluorine containing metal complex of step (b) is ammonium hexafluorotitanate, an ammonium fluorosilicate salt, or iron(III) chloride/ammonium fluoride, and the process of the present invention further comprises (d') dissolving of the PMMA in an organic liquid, such as toluene, or acetone, whereby $TiO_2$, $SiO_2$, or $Fe_2O_3$ flakes are produced.

Optionally, the metal oxide coated organic substrate or plane-parallel structure metal oxide(s) can be provided with additional metal oxide layer formed of, for example, $TiO_2$, $Fe_2O_3$, CoO, $CoTiO_3$, $Cr_2O_3$, $Fe_2TiO_5$, $SiO_2$ or a silicon suboxide of the formula $SiO_x$, wherein x is less than one and preferably about 0.2. The $SiO_x$ layer may be formed by known methods, for example, by thermally decomposing $SiH_4$ in the presence of the coated cores, in a fluidized bed reactor.

The inventive process is especially suitable for producing metal oxide(s), i.e. an oxide or mixed oxides of element of groups 3 to 12, with plane-parallel structure (flakes). The metal oxide(s) flakes, especially $Fe_2O_3$, $SiO_2$ and $TiO_2$ flakes, can be used as substrate for effect pigments.

Accordingly, in a preferred embodiment of the present invention, (e') the $TiO_2$, $SiO_2$, or $Fe_2O_3$ flakes obtained in step (d') are suspended in an aqueous solution of a fluorine scavenger; (f') an aqueous solution of one or more fluorine containing metal complexes which are the precursors of the desired metal oxide coating is added; and (g') said suspension is subjected to microwave radiation to deposit the metal oxide onto said organic material.

The further layers of the interference pigments are preferably deposited by microwave deposition, but part of the layers can also be applied by CVD (chemical vapor deposition) or by wet chemical coating.

The manufacture of the metal oxide flakes is illustrated in more detail on the basis of iron oxide flakes, especially $Fe_2O_3$ flakes, but is not limited thereto. Said flakes can, for example, be used as nucleating agent, or as substrate for effect pigments.

In said embodiment an iron oxide coating is provided on the surface of the organic material. The separation of the iron oxide flakes from the organic material can be accomplished by immersing the metal oxide coated organic material in a liquid, which dissolves the organic material.

In detail, polymethyl methacrylate (PMMA) flakes can be produced by adding a solution of polymethyl methacrylate in toluene/acetone to a glass tube that has one end sealed, connecting the tube to 20 torr vacuum and rotating it horizontally, whereby a coating of PMMA forms on the interior wall, rinsing off the PMMA off with deionized water and collecting the PMMA flakes by filtration.

Then the PMMA flakes are coated with iron oxide by microwave deposition using $FeCl_3.4NH_4F$ and boric acid. The obtained iron oxide coated PMMA flakes are collected by filtration and dried in a vacuum oven. The PMMA is dissolved in toluene by heating, and after sedimentation, filtration, washing and drying iron oxide flakes are obtained, which can be used for producing effect pigments.

Goniochromatic luster pigments based on multiply coated iron oxide platelets comprise at least one layer packet comprising
A) a colorless coating having a refractive index $n \leq 1.8$, and
B) a colorless coating having a refractive index $\leq 2.0$.

The size of the iron oxide platelets is not critical per se and can be adapted to the particular application intended. In general, the platelets have mean largest diameters from about 1 to 50 µm, preferably from 5 to 20 µm. The thickness of the platelets is generally within the range from 10 to 500 nm.

The colorless low refractive coating (A) has a refractive index $n \leq 1.8$, preferably $n \leq 1.6$. Examples of such materials are given below. Particularly suitable materials include for example metal oxides and metal oxide hydrates such as silicon oxide, silicon oxide hydrate, aluminum oxide, aluminum oxide hydrate and mixtures thereof, preference being given to silicon oxide (hydrate).

The layer thickness of the coating (A) is generally within the range from 50 to 800 nm, preferably within the range from 100 to 600 nm. Since the layer (A) essentially determines the interference colors of the pigments, it has a minimum layer thickness of about 200 nm for luster pigments which have just one layer packet (A)+(B) and which exhibit a particularly pronounced color play and hence are also preferred. If a plurality (e.g., 2, 3 or 4) of layer packets (A)+(B) are present, the layer thickness of (A) is preferably within the range from 50 to 200 nm.

The colorless high refractive coating (B) has a refractive index $n \geq 2.0$, especially $n \geq 2.4$. Examples of such materials are given below. Particularly suitable layer materials (B) include not only metal sulfides such as zinc sulfide but especially metal oxides and metal oxide hydrates, for example titanium dioxide, titanium oxide hydrate, zirconium dioxide, zirconium oxide hydrate, tin dioxide, tin oxide hydrate, zinc oxide, zinc oxide hydrate and mixtures thereof, preference being given to titanium dioxide and titanium oxide hydrate and their mixtures with up to about 5% by weight of the other metal oxides, especially tin dioxide.

The coating (B) preferably has a smaller layer thickness than the coating (A). Preferred layer thicknesses for coating (B) range from about 5 to 50 nm, especially from 10 to 40 nm.

The coating (B), which is preferred according to the present invention, consists essentially of titanium dioxide.

In said embodiment all layers of the interference pigments are preferably deposited by microwave deposition, but part of the layers can also be applied by CVD (chemical vapor deposition) or by wet chemical coating:

This invention further relates to the production of these luster pigments and to their use for coloring coatings, inks, including printing inks, plastics, glasses, ceramic products and decorative cosmetic preparations.

In an analogous manner zinc oxide (ZnO, UV reflector, acid scavenger, fluorescent whitening agent) flakes, molybdenum oxide ($MoO_3$, smoke suppressant, flame retardant) flakes, antimony oxide ($Sb_2O_3$, smoke suppressant, flame retardant) flakes, indium oxide ($In_2O_3$) flakes doped with tin oxide ($SnO_2$), titanium oxide and silicon oxide flakes can be obtained. The indium oxide flakes doped with tin oxide, typically 90% by weight $In_2O_3$ and 10% by weight $SnO_2$ can, for example, be used as antistatics.

The silicon oxide flakes can, for example, be used for improving the scratch resistance of coatings and plastics, as an anti-blocking agent for plastics, for mechanical reinforcement of plastics and for improving gas barrier properties. If the $SiO_2$ flakes are loaded with donated materials, as for example tin-donated indium oxide, as described, for example in example 5 of WO02/31060, $SiO_2$ flakes with high IR absorbency can be obtained. If the $SiO_2$ flakes are loaded with $SnO_2$, $Sb_2O_3/SnO_2$, $In_2O_3$ or $In_2O_3/SnO_2$ $SiO_2$ flakes with high IR reflecting power can be obtained as in U.S. Pat. No. 4,548,836.

Colored $SiO_2$ flakes can be produced when the deposition of the silicon oxide is carried out in the presence of an organic pigment. Suitable organic pigments have been described above. In a particularly preferred embodiment of the present invention the pigment is the condensation product of

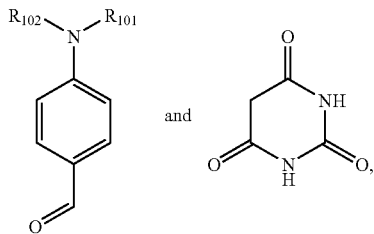

wherein $R_{101}$ and $R_{102}$ are independently hydrogen or $C_1$-$C_{18}$ alkyl, such as for example, methyl, ethyl, n-propyl, isopropyl, n-butyl, sec-butyl, isobutyl, tert-butyl, n-amyl, tert-amyl, hexyl, heptyl, octyl, 2-ethylhexyl, nonyl, decyl, dodecyl, tetradecyl, hexadecyl or octadecyl. Preferably $R_{101}$ and $R_{102}$ are methyl. The condensation product is of formula

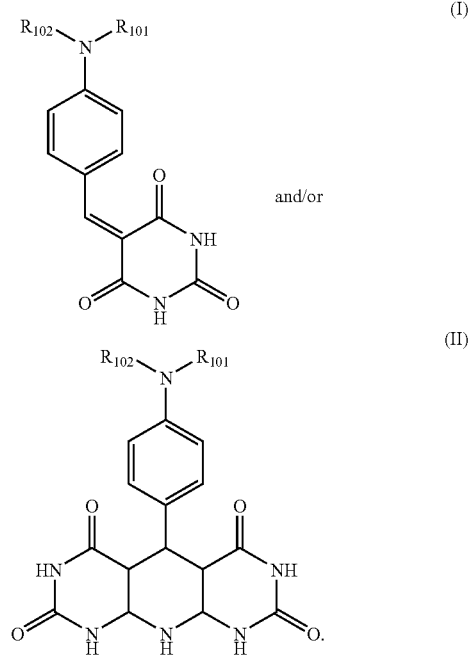

The condensation product of dialkylamino benzaldehyde and barbituric acid enhances plant growth in greenhouses, when incorporated into the thermoplastic polymer film covering the greenhouse. The incorporation of the condensation product can significantly prolong the lifetime of the polymer film.

The $SiO_2$ flakes generally have a length of from 2 μm to 5 mm, a width of from 2 μm to 2 mm, and a thickness of from 10 nm to 500 nm, and a ratio of length to thickness of at least 2:1 and two substantially parallel faces, the distance between which is the shortest axis of the core and can be used for producing effect pigments.

Preferred interference pigments on the basis of $SiO_2$ flakes comprise (a) a metal oxide of high refractive index, such as $Fe_2O_3$, or $TiO_2$, and (b) a metal oxide of low refractive index, such as $SiO_2$, wherein the difference of the refractive indices is at least 0.1: $TiO_2$ (substrate: silicon oxide; layer: $TiO_2$), $(SnO_2)TiO_2$, $Fe_2O_3$, $Sn(Sb)O_2$, $Fe_2O_3.TiO_2$ (substrate: silicon oxide; mixed layer of $Fe_2O_3$ and $TiO_2$), $TiO_2/Fe_2O_3$ (substrate: silicon oxide; first layer: $TiO_2$; second layer: $Fe_2O_3$). In general the layer thickness ranges from 1 to 1000 nm, preferably from 1 to 300 nm.

Another particularly preferred embodiment relates to interference pigments containing at least three alternating layers of high and low refractive index, such as, for example, $TiO_2/SiO_2/TiO_2$, $(SnO_2)TiO_2/SiO_2/TiO_2$, $TiO_2/SiO_2/TiO_2/SiO_2/TiO_2$ or $TiO_2/SiO_2/Fe_2O_3$:

Preferably the layer structure is as follows:
(A) a coating having a refractive index>1.65,
(B) a coating having a refractive index≦1.65,
(C) a coating having a refractive index>1.65, and
(D) optionally an outer protective layer.

Examples of a dielectric material having a "high" refractive index, that is to say a refractive index greater than about 1.65, preferably greater than about 2.0, most preferred greater than about 2.2, are zinc sulfide (ZnS), zinc oxide (ZnO), zirconium oxide ($ZrO_2$), titanium dioxide ($TiO_2$), carbon, indium oxide ($In_2O_3$), indium tin oxide (ITO), tantalum pentoxide ($Ta_2O_5$), chromium oxide ($Cr_2O_3$), cerium oxide ($CeO_2$), yttrium oxide ($Y_2O_3$), europium oxide ($Eu_2O_3$), iron oxides such as iron(II)/iron(III) oxide ($Fe_3O_4$) and iron(III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxides (SiO), selenium trioxide ($Se_2O_3$), tin oxide ($SnO_2$), tungsten trioxide ($WO_3$) or combinations thereof. The dielectric material is preferably a metal oxide. It being possible for the metal oxide to be a single oxide or a mixture of oxides, with or without absorbing properties, for example, $TiO_2$, $ZrO_2$, $Fe_2O_3$, $Fe_3O_4$, $Cr_2O_3$ or ZnO, with $TiO_2$ being especially preferred.

Nonlimiting examples of suitable low index dielectric materials that can be used include silicon dioxide ($SiO_2$), aluminum oxide ($Al_2O_3$), and metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_3Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), polymers of perfluoroalkenes, polytetrafluoroethylene (TEFLON), polymers of fluorinated ethylene propylene (FEP), parylene, p-xylene, combinations thereof, and the like. Additionally, the foregoing materials include evaporated, condensed and cross-linked transparent acrylate layers, which may be deposited by methods described in U.S. Pat. No. 5,877,895, the disclosure of which is incorporated herein by reference.

The thickness of the individual layers of high and low refractive index on the base substrate is essential for the optical properties of the pigment. The thickness of the individual layers, especially metal oxide layers, depends on the field of use and is generally 10 to 1000 nm, preferably 15 to 800 nm, in particular 20 to 600 nm.

The thickness of layer (A) is 10 to 550 nm, preferably 15 to 400 nm and, in particular, 20 to 350 nm. The thickness of layer (B) is 10 to 1000 nm, preferably 20 to 800 nm and, in particular, 30 to 600 nm. The thickness of layer (C) is 10 to 550 nm, preferably 15 to 400 nm and, in particular, 20 to 350 nm.

Particularly suitable materials for layer (A) are metal oxides, or metal oxide mixtures, such as $TiO_2$, $Fe_2O_3$, Sn(Sb)

$O_2$, $SnO_2$, titanium suboxides (reduced titanium species having oxidation states from 2 to <4), and also mixtures or mixed phases of these compounds with one another or with other metal oxides.

Particularly suitable materials for layer (B) are metal oxides or the corresponding oxide hydrates, such as $SiO_2$.

Particularly suitable materials for layer (C) are colorless or colored metal oxides, such as $TiO_2$, $Fe_2O_3$, $Sn(Sb)O_2$, $SnO_2$, titanium suboxides (reduced titanium species having oxidation states from 2 to <4), and also mixtures or mixed phases of these compounds with one another or with other metal oxides. The $TiO_2$ layers can additionally contain an absorbing material, such as carbon, selectively absorbing colorants, selectively absorbing metal cations, can be coated with absorbing material, or can be partially reduced.

Interlayers of absorbing or nonabsorbing materials can be present between layers (A), (B), (C) and (D). The thickness of the interlayers is 1 to 50 nm, preferably 1 to 40 nm and, in particular, 1 to 30 nm.

In this embodiment preferred interference pigments have the following layer structure:

| | | | |
|---|---|---|---|
| $SiO_2$ | $TiO_2$ | $SiO_2$ | $TiO_2$ |
| $SiO_2$ | $TiO_2$ | $SiO_2$ | $Fe_2O_3$ |
| $SiO_2$ | $TiO_2$ | $SiO_2$ | $TiO_2/Fe_2O_3$ |
| $SiO_2$ | $TiO_2$ | $SiO_2$ | $(Sn, Sb)O_2$ |
| $SiO_2$ | $(Sn, Sb)O_2$ | $SiO_2$ | $TiO_2$ |
| $SiO_2$ | $Fe_2O_3$ | $SiO_2$ | $(Sn, Sb)O_2$ |
| $SiO_2$ | $TiO_2/Fe_2O_3$ | $SiO_2$ | $TiO_2/Fe_2O_3$ |
| $SiO_2$ | $Cr_2O_3$ | $SiO_2$ | $TiO_2$ |
| $SiO_2$ | $Fe_2O_3$ | $SiO_2$ | $TiO_2$ |
| $SiO_2$ | TiO suboxides | $SiO_2$ | TiO suboxides |
| $SiO_2$ | $TiO_2$ | $SiO_2$ | $TiO_2 + SiO_2 + TiO_2$ |
| $SiO_2$ | $TiO_2 + SiO_2 + TiO_2$ | $SiO_2$ | $TiO_2 + SiO_2 + TiO_2$ |

In said embodiment all layers of the interference pigments are preferably deposited by microwave deposition, but part of the layers can also be applied by CVD (chemical vapor deposition) or by wet chemical coating:

| | | | |
|---|---|---|---|
| $SiO_2$ | $TiO_2$ | $Al_2O_3$ | $TiO_2$ |
| $SiO_2$ | $Fe_2TiO_5$ | $SiO_2$ | $TiO_2$ |
| $SiO_2$ | $TiO_2$ | $SiO_2$ | $Fe_2TiO_5/TiO_2$ |
| $SiO_2$ | $TiO_2$ | $SiO_2$ | $MoS_2$ |
| $SiO_2$ | $TiO_2$ | $SiO_2$ | $Cr_2O_3$ |
| $SiO_2$ | $TiO_2$ | $SiO_2$ | $TiO_2 + SiO_2 + TiO_2$ + Prussian Blue |

The metal oxide layers can be applied by means of oxidative gaseous phase decomposition of metal carbonyls (e.g. iron pentacarbonyl, chromium hexacarbonyl; as in European Application No. 45 851), by means of hydrolytic gaseous phase decomposition of metal alcoholates (e.g. titanium and zirconium tetra-n- and -iso-propanolate; as in German Application No. 41 40 900) or of metal halides (e.g. titanium tetrachloride; as in European Application No. 338 428), by means of oxidative decomposition of organyl tin compounds (especially alkyl tin compounds such as tetrabutyltin and tetramethyltin; as in German Application No. 44 03 678) or by means of the gaseous phase hydrolysis of organyl silicon compounds (especially di-tert-butoxyacetoxysilane) described in European Applicaion No. 668 329, it being possible for the coating operation to be carried out in a fluidized-bed reactor (European Application No. 045 851 and European Application No. 106 235). Layers of oxides of the metals zirconium, titanium, iron and zinc, oxide hydrates of those metals, iron titanates, titanium suboxides or mixtures thereof can be applied by precipitation by a wet chemical method, it being possible, where appropriate, for the metal oxides to be reduced. In the case of the wet chemical coating, the wet chemical coating methods developed for the production of pearlescent pigments may be used; these are described, for example, in DE-A-14 67 468, DE-A-19 59 988, DE-A-20 09 566, DE-A-22 14 545, DE-A-22 15 191, DE-A-22 44 298, DE-A-23 13 331, DE-A-25 22 572, DE-A-31 37 808, DE-A-31 37 809, DE-A-31 51 343, DE-A-31 51 354, DE-A-31 51 355, DE-A-32 11 602 and DE-A-32 35 017, DE 195 99 88, EP-A-892832, EP-A-753545, EP-A-1213330, WO93/08237, WO98/53001, WO98/12266, WO98/38254, WO99/20695, WO00/42111 and WO03/6558.

The metal oxide of high refractive index is preferably $TiO_2$ and/or iron oxide, and the metal oxide of low refractive index is preferably $SiO_2$. Layers of $TiO_2$ can be in the rutile or anastase modification, wherein the rutile modification is preferred. $TiO_2$ layers can also be reduced by known means, for example ammonia, hydrogen, hydrocarbon vapor or mixtures thereof, or metal powders, as described in EP-A-735114, DE-A-3433657, DE-A-4125134, EP-A-332071, EP-A-707050 or WO93/19131.

In a further preferred embodiment the present invention relates titanium dioxide flakes as well as to the effect pigments on the basis of the platelet-like titanium dioxide. These titanium dioxide platelets have a thickness of between 10 nm and 500 nm, preferably between 40 and 150 nm. The extent in the two other dimensions is between 2 and 200 µm and in particular between 5 and 50 µm. The titanium dioxide flakes can be used for mechanical reinforcement, for improving the scratch resistance and gas barrier properties and, in the rutile modification can, for example, be used as UV reflectors. Photoactive titanium dioxide flakes in the anastase modification (radical generators) can, for example, be used as biodegradable additives and as polymerization regulating additives.

The effect pigments on the basis of platelet-like titanium dioxide have a multilayer structure, where, on a core of platelet shaped titanium dioxide, there follows a layer of another metal oxide or metal oxide hydrate. Examples of other metal oxides or metal oxide hydrates which are applied to the titanium dioxide are $Fe_2O_3$, $Fe_3O_4$, FeOOH, $Cr_2O_3$, CuO, $Ce_2O_3$, $Al_2O_3$, $SiO_2$, $BiVO_4$, $NiTiO_3$, $CoTiO_3$ and also antimony-doped, fluorine-doped or indium-doped tin oxide. In a particular embodiment of the novel pigment, on the $1^{st}$ layer of another metal oxide or metal oxide hydrate is additionally present a $2^{nd}$ layer of a further metal oxide or metal oxide hydrate. This further metal oxide or metal oxide hydrate is aluminium oxide or aluminium oxide hydrate, silicon dioxide or silicon dioxide hydrate, $Fe_2O_3$, $Fe_3O_4$, FeOOH, $ZrO_2$, $Cr_2O_3$ as well as antimony-doped, fluorine-doped or indium-doped tin oxide.

The layer of another metal oxide which is applied to the titanium dioxide platelets has a thickness of 5 to 300 nm, preferably between 5 and 150 nm.

The coating of the titanium dioxide platelets, after drying in between, can be carried out with metal oxides or metal oxide hydrates, for example, in a fluidized bed reactor by means of gas-phase coating, it being possible, for example, to use the processes for the preparation of pearl lustre pigments proposed in EP-A-045851 and EP-A-106235, by conventional wet chemical methods, or by microwave deposition.

While it is preferred that all metal oxide layers are deposited using microwave radiation, part of the metal oxides can be deposited by conventional wet chemical methods: When coating with haematite ($Fe_2O_3$), the starting materials can be either iron(III) salts, as is described, for example, in U.S. Pat. No. 3,987,828 and U.S. Pat. No. 3,087,829, or iron(II) salts, as described in U.S. Pat. No. 3,874,890, the initially formed coating of iron(II) hydroxide being oxidized to iron(III) oxide hydrate. Iron(III) salts are preferably used as starting materials.

Coating with magnetite ($Fe_3O_4$) is carried out by hydrolysis of an iron(II) salt solution, for example, iron(II) sulfate, at a pH of 8.0 in the presence of potassium nitrate. The particular precipitation examples are described in EP-A-659843.

For better adhesion of the iron oxide layers to the titanium dioxide platelets it is expedient to apply a tin oxide layer first.

Another metal oxide which is preferably deposited on the titanium dioxide platelets is chromium oxide. The deposition can easily be effected by means of thermal hydrolysis, which occurs in the volatilization of ammonia from an aqueous solution of a hexaminechromium(III) derivative, or by thermal hydrolysis of a chromium salt solution which is buffered with borax. Coating with chromium oxide is described in U.S. Pat. No. 3,087,828 and U.S. Pat. No. 3,087,829.

The pigments do not have to be calcined in every case. For certain applications drying at temperatures of 110° C. is sufficient. If the pigment is calcined, temperatures between 400° C. and 1000° C. are set, the preferred range being between 400° C. and 700° C.

It is additionally possible to subject the pigments to an aftercoating or aftertreatment which further increases the light stability, weathering resistance and chemical stability or facilitates the handling of the pigment, especially its incorporation into different media. Examples of suitable aftercoating techniques are those described, for example, in DE-C 22 15 191, DE-A 31 51 354, DE-A 32 35 017 or DE-A 33 34 598. Owing to the fact that the properties of the novel pigments are already very good without these additional measures, these optional additionally applied substances make up only from about 0 to 5% by weight, in particular from about 0 to 3% by weight, of the overall pigment.

The effect pigments formed in accordance with the present invention may be further subjected to post treatment (surface modification) using any conventionally known method to improve the weatherability, dispersibility and/or water stability of a pigment. The coated organic material of the present invention is suitable for use in applications requiring decorative qualities such as for sun glasses, cosmetics (lipsticks, blushes, foundations, nail varnishes and hair shampoos), textile decoration by screen printing, inks, paints and plastics.

The following examples are for illustrative purposes only and are not to be construed to limit the scope of the instant invention in any manner whatsoever.

EXAMPLE 1

A piece of 1.5 cm×1.5 cm polycarbonate sheet is rinsed with ethanol and deionized water respectively. It is then immersed into 11 ml boric acid aqueous solution (0.2 M, 2.2 mmol). At first, 1 ml ammonium hexafluorostannate solution (0.1 M, 0.1 mmol) is added and a reaction in a microwave oven is carried out for 1 minute at power level 1. The mixture is allowed to stand for 30 minutes to cool down. Secondly, 10 ml ammonium hexafluorotitanate solution (0.1 M, 1 mmol) are added and the microwave treatment (1 minute at power level 1) is repeated for 5 times at 10 minute intervals. The polycarbonate sheet is removed from the reaction mixture and rinsed with water and ethanol.

EXAMPLE 2 a) 2 ml toluene solution of polymethyl methacrylate (1.2 wt. %) and 2 ml acetone are added to a glass tube that has one end sealed. The tube has a diameter of 6.0 cm and length of 28.0 cm. By connecting the tube to 20 torr vacuum and rotating it horizontally for 30 minutes a coating of PMMA forms on the interior wall. 10 ml deionized water is used to rinse the PMMA off. The flakes of PMMA are collected by filtration.

b) To 0.1 g polymethyl methacrylate flakes made with the method of Example 2a) is added 50 ml deionized water. The mixture is sonicated for 20 minutes and transferred to a Teflon beaker. To the stirred mixture is added 10 ml 0.4 M aqueous solution of $FeCl_3 \cdot 4NH_4F$ and 10 ml 0.8 M boric acid simultaneously at 0.2 ml/min. The resulting bronze color suspension is stirred for another two hours then treated with microwave irradiation for 10 minutes. 0.4 g powder is collected by filtration and dried in vacuum oven for 12 hrs.

EXAMPLE 3

0.3 g of the product from Example 2b) are immersed in 10 ml toluene and heated to 60° C. for 5 minutes. The obtained $Fe_2O_3$ flakes are sedimentated for three hours, then filtered and rinsed with acetone. The $Fe_2O_3$ flakes exhibit a red/yellowish color.

EXAMPLE 4

To 0.1 g polymethyl methacrylate flakes made with the method of Example 2b) is added 50 ml deionized water. The mixture is sonicated for 20 minutes and transferred to a Teflon beaker. To the stirred mixture is added 5 ml 0.4 M aqueous solution of $FeCl_3 \cdot 4NH_4F$ and 5 ml 0.8 M boric acid aqueous solution simultaneously at 0.2 ml/min. With microwave irradiation the temperature is raised to 50° C. and held for 30 minutes. Then 5 ml 0.4 M ammonium hexafluorotitanate and 5 ml 0.8 M boric acid aqueous solution are added simultaneously at 0.4 ml/min. After another 30 minutes of microwave irradiation the reaction mixture is allowed to cool down to ambient temperature. The coating process of iron oxide with 5 ml 0.4 M aqueous solution of $FeCl_3 \cdot 4NH_4F$ and 5 ml 0.8 M boric acid aqueous solution is repeated. 0.5 g powders is collected by filtration and dried in vacuum oven for 12 hrs.

EXAMPLE 5

0.4 g of the flakes from Example 4 are immersed in 10 ml toluene and heated to 60° C. for 5 minutes. The obtained $TiO_2/Fe_2O_3/TiO_2$ flakes are sedimentated for three hours, then filtered and rinsed with acetone. The $TiO_2/Fe_2O_3/TiO_2$ flakes exhibit a green/yellowish color.

We claim:

1. A process for the preparation of a material comprising an organic substrate and at least one dielectric layer consisting of one or more oxides of a metal selected from groups 3 to 15 of the periodic table, which comprises the steps of:
   (a) suspending the organic substrate in an aqueous solution of a fluorine scavenger;
   (b) adding an aqueous solution of one or more fluorine containing metal complexes which are the precursors of the desired metal oxide coating; and
   (c) subjecting said suspension to microwave radiation to deposit the metal oxide onto said organic substrate, wherein steps (b) and (c) can optionally be repeated using different fluorine containing metal complexes to produce one or more metal oxide layers or a gradient of concentration of 2 different metal oxides across the thickness and which steps further comprise dissolving of the organic substrate, to yield one or more of the deposited free metal oxides or mixed metal oxides.

2. The process according to claim 1, wherein the fluorine scavenger is selected from the group consisting of boric acid, an alkali metal borate selected from the group consisting of sodium borate, ammonium borate, boron anhydride and boron monoxide.

3. The process according to claim 1, wherein the fluorine containing metal complex is selected from the group consisting of ammonium hexafluorotitanate; ammonium hexafluorostanate; ammonium hexafluorosilicate; iron(III) chloride, hydrofluoric acid and ammonium fluoride mixtures; aluminum(III) chloride, hydrofluoric acid and ammonium fluoride mixtures; ammonium hexafluorogermanate; indium(III) fluoride, hydrofluoric acid and ammonium fluoride mixtures; and combinations of indium(III) fluoride trihydrate and ammonium hexafluorostanate.

4. The process of claim 1, wherein the process is carried out at a temperature between the freezing point and the boiling point of the aqueous solution.

5. The process of claim 1, wherein the metal oxide is titanium dioxide and the fluorine containing metal complex is selected from the group consisting of ammonium hexafluorotitanate, a complex prepared from ammonium fluoride and titanium chloride or titanium chloride, ammonium fluoride and hydrogen fluoride, or the metal oxide is iron oxide and the fluorine containing metal complex is selected from the group iron(III) chloride, hydrofluoric acid and ammonium fluoride mixtures.

6. The process of claim 1, wherein the metal oxide is silicon dioxide and the fluorine containing metal complex is ammonium hexafluorosilicate or ammonium pentafluorosilicate.

7. The process of claim 1, wherein the organic substrate is selected from the group consisting of polycarbonate, polyamide, polyethylene, polyethylene terephthalate, polymethyl methacrylate (PMMA), epoxy resins, ABS (acrylonitrile/butadiene/styrene), and polyolefin matrices.

8. The process of claim 1 further comprising the steps of:
(d) adding a solution of one or more fluorine containing metal complexes which are the precursors of the desired metal oxide coating which is different from the oxide coating in step
(b); and
(e) subjecting said suspension to microwave radiation to deposit the metal oxide onto the coated organic substrate.

9. The process of claim 8, wherein the organic substrate is polycarbonate, the fluorine containing metal complex of step (b) is ammonium hexafluorotitanate and the fluorine containing metal complex of step (d) is an ammonium fluorosilicate salt.

10. The process of claim 8 further comprising the steps of:
(f) adding a solution of one or more fluorine containing metal complexes which are the precursors of the desired metal oxide coating which is different from the oxide coating in step
(d); and
(g) subjecting said suspension to microwave radiation to deposit the metal oxide onto the coated organic substrate.

11. The process of claim 1, wherein the organic substrate is polycarbonate and the fluorine containing metal complex is ammonium hexafluorotitanate, or an ammonium fluorosilicate salt.

12. The process of claim 1, wherein the organic substrate is a plate, plane parallel structure or flake of PMMA, the fluorine containing metal complex of step (b) is ammonium hexafluorotitanate, an ammonium fluorosilicate salt, or iron (III) chloride/ammonium fluoride, further comprising (d') dissolving of the PMMA in an organic liquid,—whereby $TiO_2$, $SiO_2$, or $Fe_2O_3$ flakes are produced.

13. The process of claim 12, wherein (e') the $TiO_2$, $SiO_2$, or $Fe_2O3$ flakes obtained in step (d') are suspended in an aqueous solution of a fluorine scavenger;
(f') an aqueous solution of one or more fluorine containing metal complexes which are the precursors of the desired metal oxide coating is added; and
(g') said suspension is subjected to microwave radiation to deposit the metal oxide onto said flakes.

14. The process of claim 13, wherein (e') the metal oxide flakes obtained in step (d') are titanium dioxide flakes, and the first metal oxide layer is selected from $Fe_2O_3$, $Fe_3O_4$, FeOOH, $Cr_2O_3$, CuO, $Ce_2O_3$, $Al_2O_3$, $SiO_2$, $BiVO_4$, $NiTiO_3$, $CoTiO_3$ and antimony-doped, fluorine-doped or indium-doped tin oxide iron oxide, and an optionally present second metal oxide layer is selected from aluminium oxide or aluminium oxide hydrate, silicon dioxide or silicon dioxide hydrate, $Fe_2O_3$, $Fe_3O_4$, FeOOH, $TiO_2$, $ZrO_2$, $Cr_2O_3$,
antimony-doped, fluorine-doped or indium-doped tin oxide;
or
(e') the metal oxide flakes obtained in step (d') are iron dioxide flakes and the first metal oxide layer is a colorless coating having a refractive index $n \leq 1.8$, and an optionally present second metal oxide layer is a colorless coating having a refractive index $\geq 2.0$.

15. The process according to claim 14, wherein the colorless coating having a refractive index $n \leq 1.8$ is silicon oxide, silicon oxide hydrate, aluminum oxide, aluminum oxide hydrate and mixtures thereof.

16. The process according to claim 14, wherein the colorless coating having a refractive index $\geq 2.0$ is titanium dioxide, titanium oxide hydrate, zirconium dioxide, zirconium oxide hydrate, tin dioxide, tin oxide hydrate, zinc oxide, zinc oxide hydrate and mixtures thereof.

17. A process for the preparation of an organic material comprising an organic substrate and at least one dielectric layer consisting of one or more oxides of a metal selected from groups 3 to 15 of the periodic table, which comprises the steps of:
(a) suspending the organic substrate in an aqueous solution of a fluorine scavenger;
(b) adding an aqueous solution of one or more fluorine containing metal complexes which are the precursors of the desired metal oxide coating;
(c) subjecting said suspension to microwave radiation to deposit the metal oxide onto said organic material, wherein steps (b) and (c) can optionally be repeated using different fluorine containing metal complexes to produce one or more metal oxide layers or a gradient of concentration of 2 different metal oxides across the thickness;
(d) adding a solution of one or more fluorine containing metal complexes which are the precursors of the desired metal oxide coating which is different from the oxide coating in step (b);
(e) subjecting said suspension to microwave radiation to deposit the metal oxide onto the coated organic substrate;

(f) adding a solution of one or more fluorine containing metal complexes which are the precursors of the desired metal oxide coating which is different from the oxide coating in step (d);

(g) subjecting said suspension to microwave radiation to deposit the metal oxide onto the coated organic substrate, wherein the metal oxide in steps (b) and (f) is iron oxide and the fluorine containing metal complex is selected from the group iron(III) chloride, hydrofluoric acid and ammonium fluoride mixtures, and the metal oxide in step (d) is titanium dioxide and the fluorine containing metal complex is selected from the group consisting of ammonium hexafluorotitanate, a complex prepared from ammonium fluoride and titanium chloride or titanium chloride, ammonium fluoride and hydrogen fluoride.

* * * * *